US008275840B2

(12) United States Patent
Atchison et al.

(10) Patent No.: US 8,275,840 B2
(45) Date of Patent: Sep. 25, 2012

(54) AUTOMATED MESSAGING TOOL

(75) Inventors: Charles E. Atchison, Alpharetta, GA (US); Goutham Belliappa, Atlanta, GA (US); Michelle L. Randolph, McDonough, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1332 days.

(21) Appl. No.: 10/932,868

(22) Filed: Sep. 2, 2004

(65) Prior Publication Data

US 2006/0059234 A1   Mar. 16, 2006

(51) Int. Cl.
G06F 15/16   (2006.01)
(52) U.S. Cl. ........................................ 709/206; 709/207
(58) Field of Classification Search ........... 709/206–207
See application file for complete search history.

(56) References Cited

U.S. PATENT DOCUMENTS

| | | | | |
|---|---|---|---|---|
| 6,732,102 B1 * | 5/2004 | Khandekar | ........................... | 1/1 |
| 6,789,115 B1 * | 9/2004 | Singer et al. | .................. | 709/224 |
| 7,209,934 B2 * | 4/2007 | Atchison | ............................... | 1/1 |
| 7,584,230 B2 * | 9/2009 | Atchison | ............................... | 1/1 |
| 2003/0233366 A1 * | 12/2003 | Kesselman et al. | ........... | 707/100 |
| 2005/0097149 A1 * | 5/2005 | Vaitzblit et al. | ............... | 707/202 |
| 2005/0172297 A1 * | 8/2005 | Garcia | ........................... | 719/310 |
| 2006/0143040 A1 * | 6/2006 | Scheier et al. | ..................... | 705/1 |
| 2007/0039009 A1 * | 2/2007 | Collazo | .......................... | 719/319 |

OTHER PUBLICATIONS

VisualCron, Jul. 2004, obtained from the Internet.*
VisualCron, v4.9.11, Jul. 28, 2004.*
VisualCron v1.1.5, Sep. 17, 2004.*
Windows 2000 Task Scheduler, by Kathy Ivens, Jan. 2001.*

* cited by examiner

Primary Examiner — Kamal Divecha
(74) Attorney, Agent, or Firm — Thomas, Kayden, Horstemeyer & Risley, LLP

(57) ABSTRACT

A system and method for an automatic messaging system which automatically sends emails or pages to groups of people with specific data from a database. Other messaging tools may be utilized. The data source that provides information may be any ODBC compliant data source including standard DBMS (SQL Server, Oracle, Informix, DB2, Sybase, etc.) Access databases, or Excel spreadsheets.

9 Claims, 21 Drawing Sheets

AUTOMATED MESSAGING TOOL

TECHNICAL FIELD

The present disclosure is generally related to software for computers and, more particularly, is related to a system and method for automatically sending messages with particular data.

COPYRIGHT NOTICE

A portion of the disclosure of this patent document contains material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Electronic mail, or email, has rapidly become one of the most ubiquitous forms of communication in the office and business world, and is also rapidly becoming the same in the home and private spheres. Because of the popularity of email as a communication medium, more and more mobile devices, such as pagers, Personal Digital Assistants ("PDAs"), cellphones and other appliances are beginning to provide email capability. Most mobile devices can receive and display text messages, and the more sophisticated devices can acknowledge, compose, and send email messages.

Email provides a quick and convenient way for computer users to communicate. This communication is initiated by a message sender who composes the message using a text editing program, provides the email address of the intended recipient, and often provides an indication of the content (subject matter) of the message by providing text in a "subject" field. Using well-understood technology this composed message is then sent to the recipient's computer address. The recipient's computer receives the message and stores it in the recipient's inbox. The recipient eventually reads, deletes, responds to, or otherwise processes the message stored within the inbox by using any of a number of email programs well known in the art.

The header portion of an email message contains fields composed of character strings comprising a field-name followed by a colon, followed by a field-body terminated by a carriage return/line feed. An example of a header field is:

"To: John Doe<CR><LF>".

In this example, the <CR> represents the ASCII carriage return character and the <LF> represents the ASCII line feed character. The header field-names are not case sensitive, thus, "to:" is equivalent to "TO:" or "tO:". The contents of these headers are specified by the entity that composes the message.

The "To:" field-body contains the addresses of the primary recipients of the message where the address of each recipient is separated by a comma or a semicolon. Recipients include both humans and programs. The "Subject:" field-body often provides a summary, or indicates the nature of the message and sometimes contains a specialized command string that is to be recognized by the recipient. Although, these fields are all initialized by the sender, the recipient fields are generally limited to actual Internet addresses. On the other hand, the subject field has no specific meaning and may, in fact, be blank, contain a specialized command string, or contain a random arrangement of characters. Additional "cc:" and "bcc:" field bodies are optional means for sending declared and undeclared ('blind') copies of the message to one recipient or groups of recipients.

A sender can address a single message to many recipients by separating the addresses of the recipients with a comma or a semicolon. Each of these recipients may respond to the original message by sending a reply message to the same list of recipients (plus the original sender). Some of these recipients may then respond to the first reply message. These reply messages are termed follow-up messages to the original message. This process facilitates a vigorous discussion between the original sender and the recipients, as well as between the recipients.

Today's business world is data-intensive and databases are constructed to arrange, save, and retrieve the generated data. A database system is a collection of information organized in such a way that data may be accessed quickly. Database applications are present in everyday use including automated teller machines, flight reservation systems, and internet-account systems of all types. A database management system (DBMS) is a collection of programs that allow the entry, modification, and selection of data in a database. There are various types of DBMSs, ranging from small systems that run on personal computers to larger systems that run on mainframe systems.

Requests for information from a database are made by a database server using a query language. Different DBMSs support different query languages, including a standardized language called "structured query language" (SQL), for example. Database servers that use SQL are often referred to as "SQL servers." However, one detraction of SQL and other query languages is that they are not simple. Also, it may take up to a week for an experienced programmer to write a report to extract desired data. And the program itself is fairly costly.

There is not a simple method to disseminate the data from a database to a selected list of people. Thus, a heretofore unaddressed need exists in the industry to address the aforementioned deficiencies and inadequacies.

SUMMARY

Embodiments of the present disclosure provide a system and method for automatically sending messages with particular data.

Briefly described, in architecture, one embodiment of the system, among others, can be implemented as follows: a system comprising querying logic configured with configuration information for selecting data from the database and messaging logic configured with configuration information for sending the selected data to at least one address entry of an address list.

The present disclosure can also be viewed as providing methods for automatically transmitting data. In this regard, one embodiment of such a method, among others, can be broadly summarized by the following steps: maintaining an address list of address entries; configuring at least one configuration file with information for automatically sending data from a database to at least one address entry in the address list; and executing logic using the information from the configuration file to send a message including data from a database to the at least one address entry in the address list using a messaging system.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Certain embodiments of the present disclosure can be implemented in hardware, software, firmware, or a combination thereof. In one embodiment(s) among others, the method is implemented in software or firmware that is stored in a memory and that is executed by a suitable instruction execution system. If implemented in hardware, as in an alternative embodiment, the method can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Disclosed herein are systems and methods for automatically sending messages with particular data. To facilitate description of the inventive systems, an example system that can be used to implement the systems and methods for automatically sending messages with particular data is discussed with reference to the figures. Although this system is described in detail, it will be appreciated that this system is provided for purposes of illustration only and modifications are feasible without departing from the inventive concept. After the example system has been described, an example of the operation of the system will be provided to explain the manner in which the system can be used to provide a system for automatically sending messages with particular data.

Referring now and in more detail to the drawings in which like numerals indicate corresponding parts throughout the several views, this disclosure is meant to describe the automatic messaging system. It details how the system may be configured and used. The automatic messaging system is a system that, in one example, automatically sends out emails or pages to groups of people with the specific information from a database. The data source that provides information may be, for example, an ODBC compliant data source including standard DBMS (SQL Server, Oracle, Informix, DB2, Sybase, etc.) Access databases, or Excel spreadsheets, among others.

Figure 1:
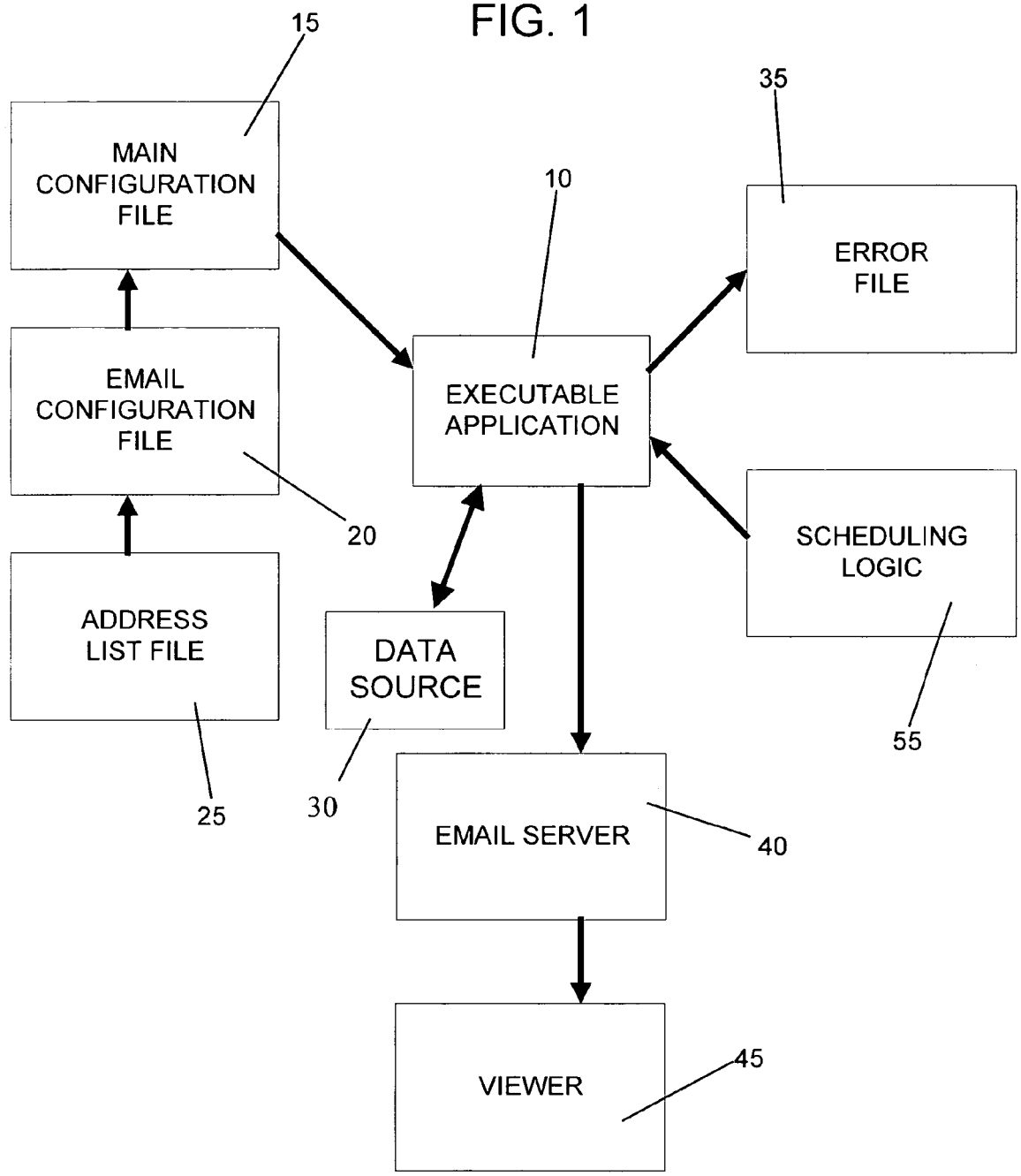
FIG. 1 is a block diagram giving an exemplary high level overview of an automatic messaging system.
Figure 2:
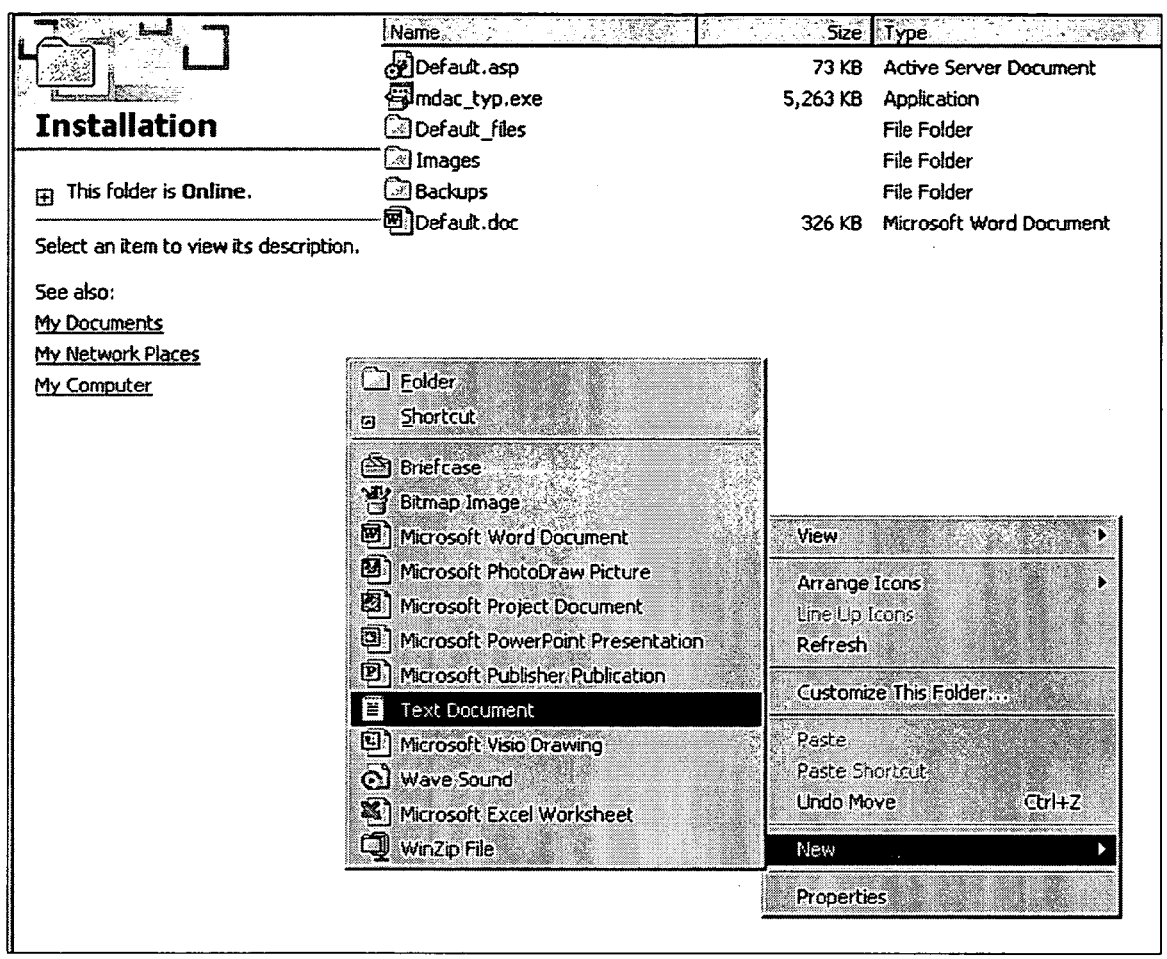
FIG. 2 illustrates an exemplary screen shot showing how to create a blank file for the automatic messaging system of FIG. 1.

FIG. 1 is a block diagram providing an exemplary, high level overview of an automatic messaging system. An exemplary embodiment of the automatic messaging system uses an executable application 10, which, in one embodiment is a file is named "page_sender" that uses the send mail protocol of Microsoft® Windows® operating system for message generation and is programmed in Visual Basic. Of course other electronic messaging protocols and programming languages are used in alternative embodiments. A main configuration file 15 is configured, and the name of the file is designated as a parameter for the application 10 to start its processing. The configuration of application 10 enables the application 10 to send pages or emails to users automatically. The page_sender application 10 of this exemplary embodiment may use three basic classifications of files to operate, examples of the files including: the main configuration file 15, an email configuration file 20, and an address list file 25.

The main configuration file 15 may contain the following fields: Sender, SMTP Address list, Port, a default mandatory email address, and an email configuration file 20 filename. The Sender field is the address which will be listed in the "Sender" and "Reply To" fields.—An SMTP list of addresses includes addresses of valid email servers from which an email can be sent. The list may be comma separated. The application 10 may send the email from the first valid and working server in the SMTP address list. The port may be the port to use on the SMTP server. The default port is 25 for most email servers. The default mandatory email address is used such that, in sending an email, there should be at least one person in the "To" field. This is to handle instances when the mailing list is either empty or non-existent.

The email configuration file 20 contains other parameters used by the application 10. The email configuration file 20 may store the definitions of one or more queries. The file may contain parameters for one or more emails. Each set of email parameters may begin with a "BEGIN" delimiter and may end with an "END" delimiter and the "BEGIN" and the "END" may be capitalized. One embodiment of the email configuration file 20 contains the following information:

(1) "BEGIN" delimiter: A "BEGIN" delimiter tells the email program that the parameters for this email start from the next line.

(2) CONN_STRING: This parameter specifies the connection to be used by the applications connected to the data source.

(3) SQL: This may consist of one or more lines that will constitute a simple or complex SQL statement that may be sent in an email.

(4) Sender: The Sender field is a custom field that may signify a sender name. It need not be a real name, and it may be configured to be the server name or name of a process or project, etc. For example, "Big Foot Server."

(5) Subject: This field contains the subject of the email.

(6) Header: This may be one or more lines of header that is included in the body text of the email.

(7) Footer: One or more lines of footer may be included at the bottom of the email.

(8) Recipients: This is the name of the address list file 25 that contains the distribution list (list of who will receive the email).

(9) "END" Delimiter: Signifies the end of the list of parameters for this email.

Following the END delimiter, another set of parameters for another email may be specified in the same file. This is particularly useful if there is a need to send out a sequence of emails periodically to the same or different user groups. If the email parameters are specified in one file then just a single command will send out all the emails.

Address list file 25 is a file that contains a list of email addresses. The file is configured with an email address on each line within the file. The messaging application 10 will open this file and, for example, add each recipient into the "To:" field of an email before sending out the email.

Data source 30 is the source of the data for the SQL query. In one embodiment, the source may be any ODBC compliant data source like a standard database (SQL Server, Oracle, Informix, DB2, Sybase, etc.). The user should have permission (a valid user id and password) to use the data source with sufficient privileges to run the SQL query.

The automatic messaging application 10 may create an error file 35, an error file 35 may be created by he operating system, or the automatic messaging application 10 may append an existing error file should the automatic messaging application 10 terminate abnormally due to any error conditions. The error file 35 may be named with the date on which the error occurred. The error file 35 may contain the time that the error occurred, the error number (an error indicator which can be referenced on material distributed from the operating system manufacturer) and the error message along with the name of the main configuration file 15 that was used at the time the automatic messaging application 10 encountered an error condition. Error conditions may include incorrect SQL queries, incorrect user name and password to the data source, incorrect connection string, invalid file formatting, etc.

The email server 40 is the email server that is used to send (bounce) email. According to an exemplary embodiment, it generally uses the address of a company's SMTP server (e.g. mail.company.com). The executable application 10 may be executed on a client or on a server. The application 10 sends a message as configured to a receiving device 45 in a format that a recipient may view. Nonlimiting examples of the receiving device 45 are as follows: a personal computer (PC) capable of displaying the notification through e-mail or some other communications software, a television, a wireless (e.g., cellular, satellite, etc.) or non-wireless device such as a pager, a personal data assistant, or any other device capable of notifying the user with some type of user perceptible emission.

The created configuration files are used to initiate the sending of emails. The configuration files may reference the others; that is, the main configuration file 15 may reference the email configuration file 20, and the email configuration file 20 may reference the address book file 25. Once the configuration files have been created and configured to run the automatic messaging application 10, a DOS command, "page_sender.exe config.ini" is entered at a DOS command prompt. Page sender.exe may be the name of executable application 10, and config.ini may be the name of the main configuration file 15. The name of the main configuration file 15 is passed in as a command line parameter to the page_sender application 10 telling the application 10 from which file to get the configuration parameters. For instance, if the main configuration file 15 were named main_config.txt, then the command to the executable page_sender application 10 would be "page_sender.exe main_config.txt". However, all paths are relevant to the path of the folder where the application 10 is running. Therefore, config.txt with no folders before it would mean the configuration files are stored in the same folder as the application 10. If the configuration files are stored in a different folder than the application 10, the path should precede the name of the file.

Figure 3:
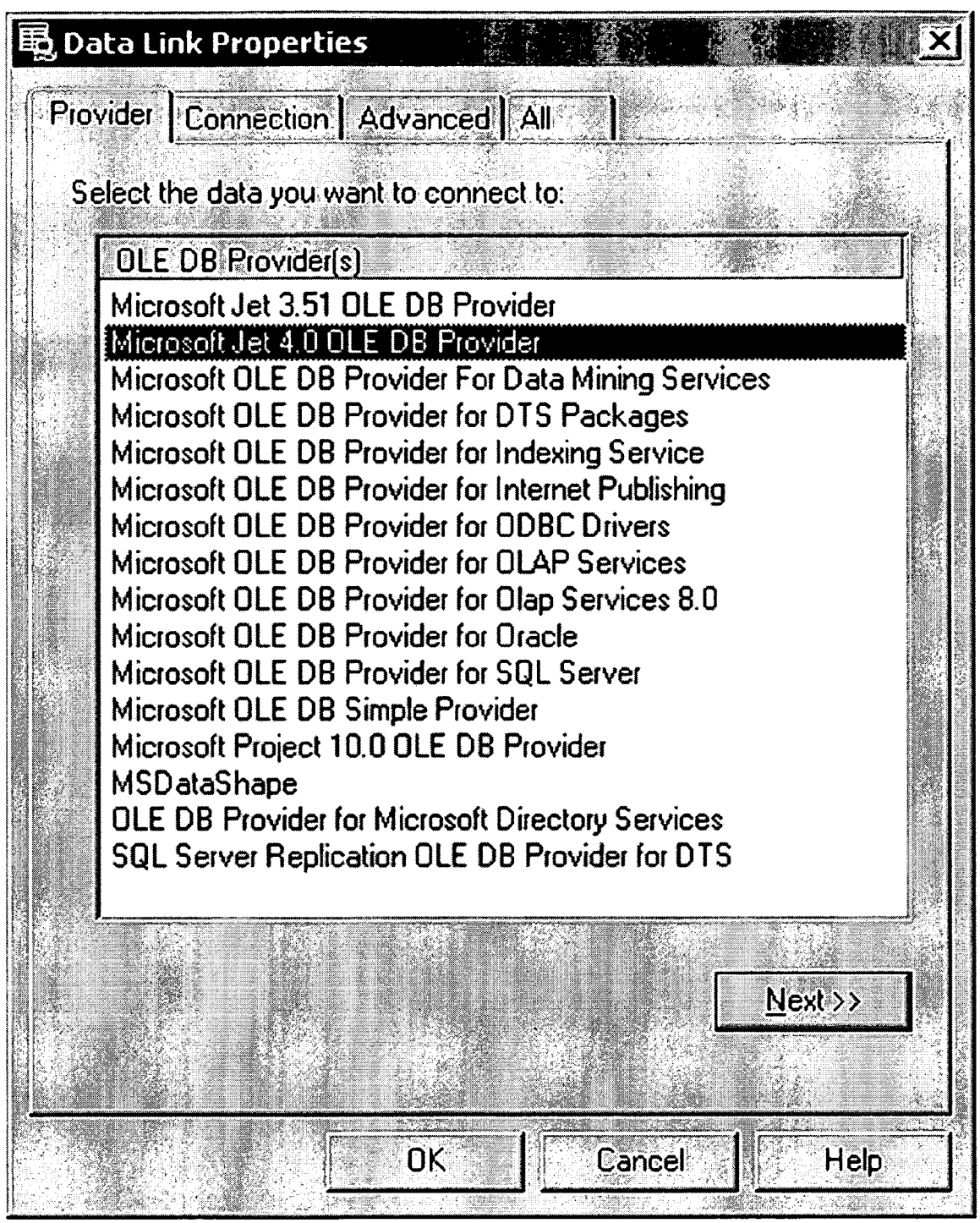
FIG. 3 illustrates an exemplary screen shot showing how a connection string to an Access database is created.
Figure 4:
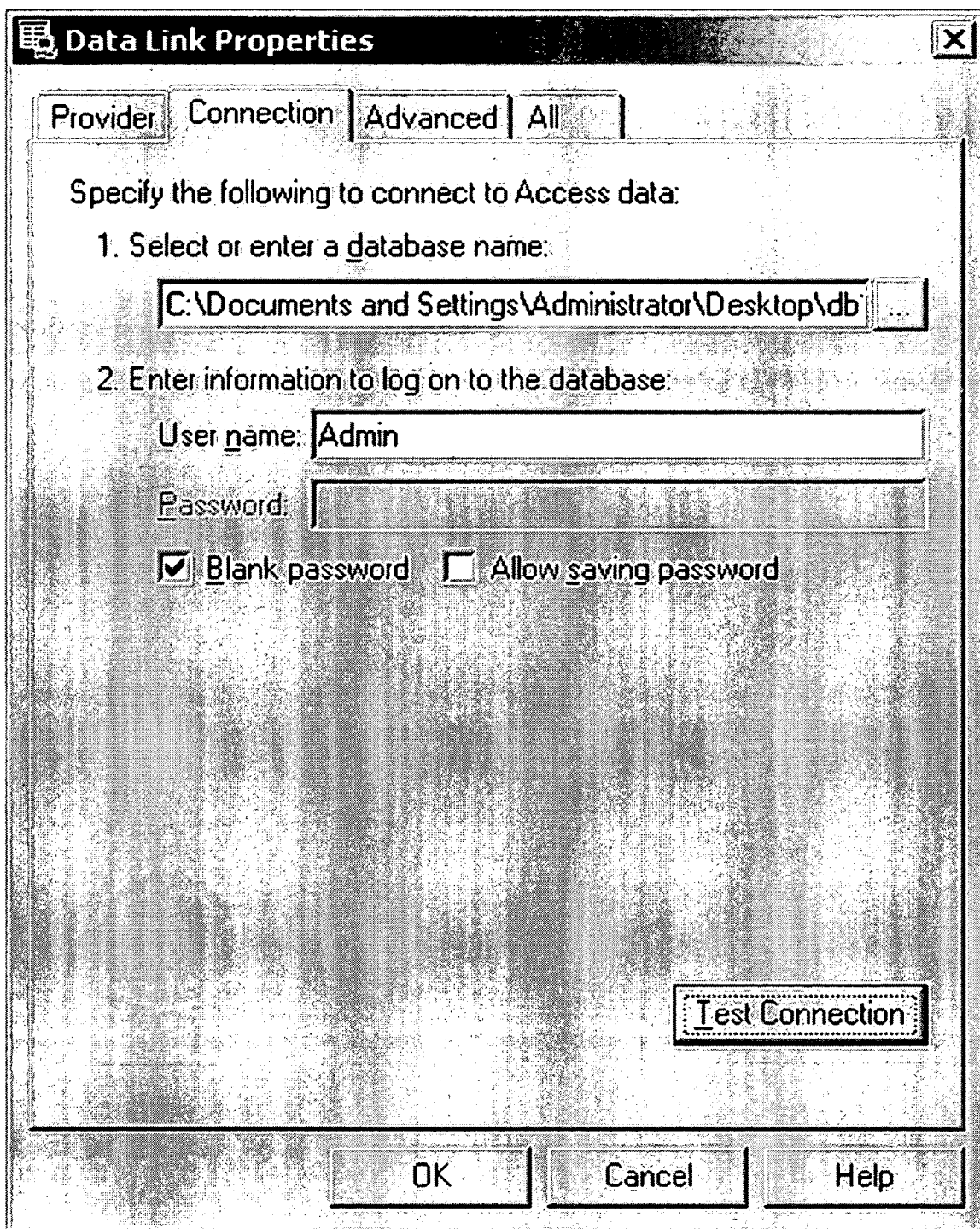
FIG. 4 illustrates an exemplary screen shot demonstrating how to browse to a database file.

FIGS. 2 through 8 illustrate screen shots showing a method of connecting to heterogeneous data sources 30 (databases from different applications such as Oracle, DB2, and Access among others) by configuring the connection string. First, referring to FIG. 2, a user may create a blank file by right clicking within a folder in Windows and then clicking on "New File" and "New Text Document" as illustrated. Next, the user renames the file from .txt to .udl (universal data link). The icon shown in Windows will change to a data link icon. The user then double clicks on the UDL file. For an Access database, for instance, the user may select JET version 4.0 as shown in FIG. 3, and then click "Next." The data link configuration screen may appear as shown in FIG. 4. The tabs may be configured depending on the needs of the user.

Figure 5:
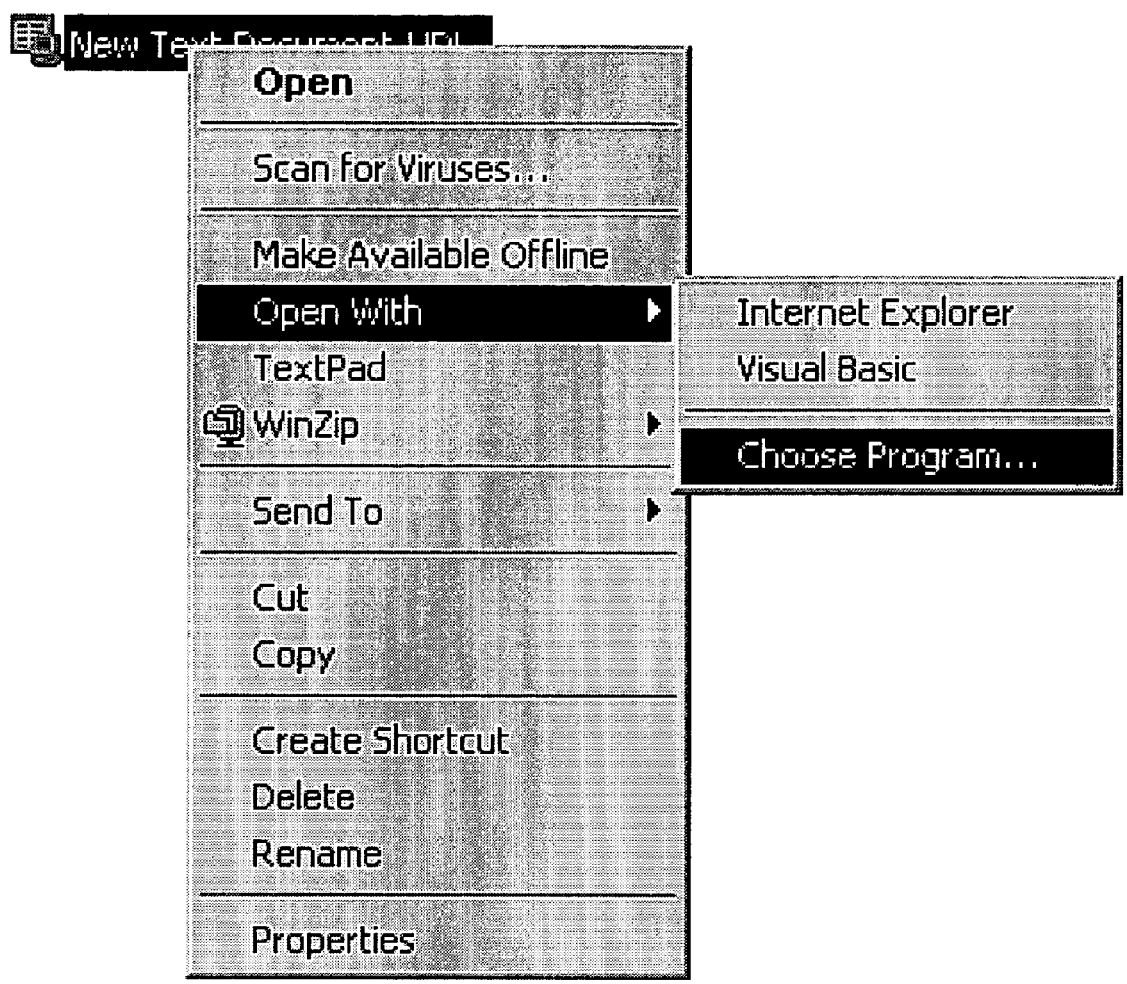
FIG. 5 illustrates an exemplary screen shot showing how to open a UDL file with another program.
Figure 6:
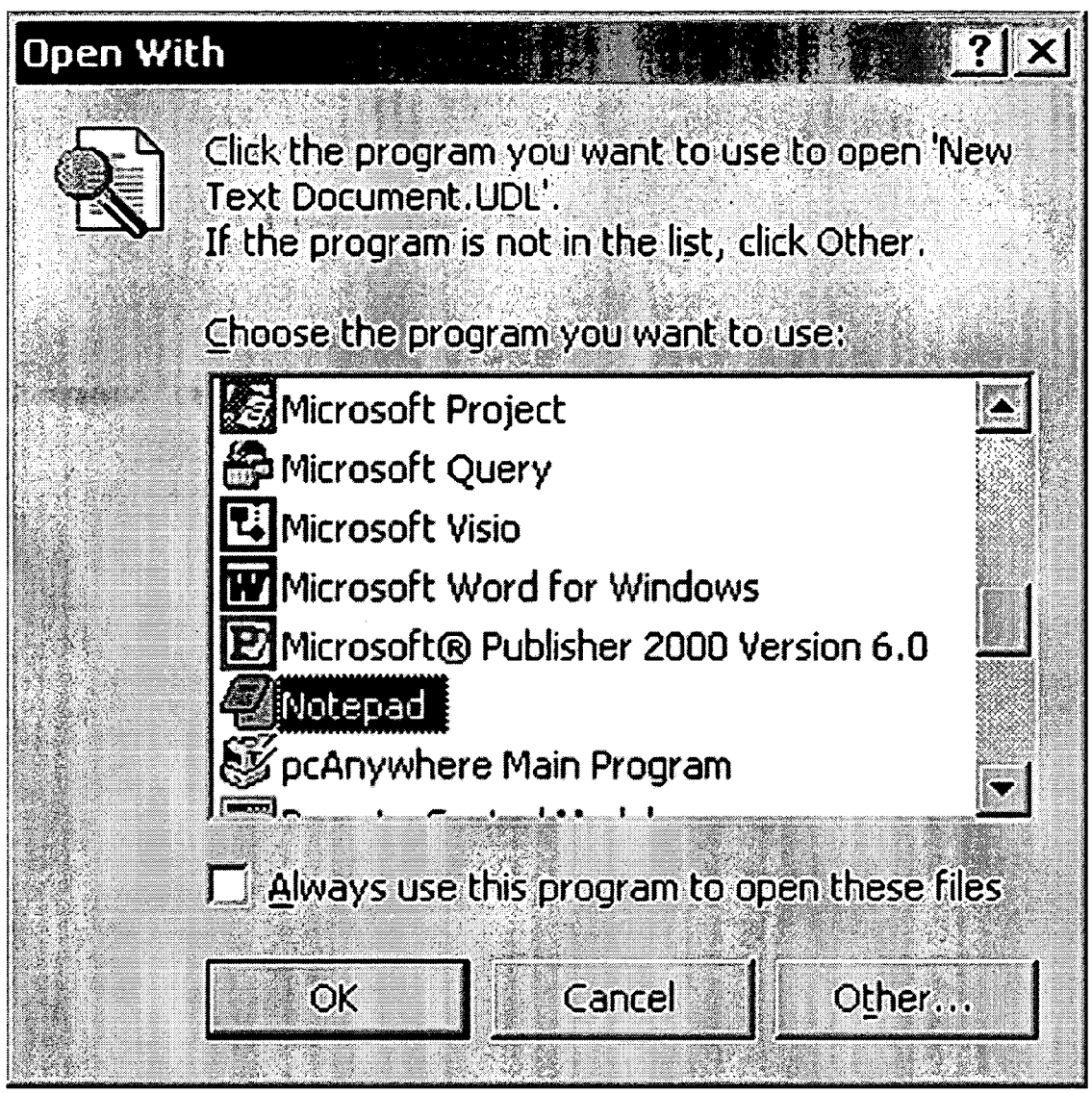
FIG. 6 illustrates an exemplary screen shot showing how to choose a text editor such as Notepad in Microsoft Windows.

FIG. 4 shows how a connection string may be generated to an access database on a Windows desktop. The first step is to begin with the provider tab to choose the type of connection. As shown in FIG. 4, the screen allows the user to browse the database file. Once the user has browsed to the file, the user clicks on "Test Connection" to test the connection to the database. If the test is positive, then the connection is almost ready. The user then clicks "OK" to exit. Next, the file is opened with a text editor, such as Text Pad or Note Pad. The next step is to right click on the UDL file and choose to open it with another program, as illustrated in FIG. 5. Then, Note Pad may be chosen as shown in FIG. 6 and the user may click "OK." The third line of the file may start with something such as "Provider=Microsoft . . . " The required connection string is everything on the line after the "=" sign. An operating system such as Microsoft Windows may abstract the connection string. For instance, Microsoft.Jet.OleDB is specific to the computer, the operating system, and the edition of the SQL server. Developers may allow Microsoft Windows to generate the connection string because it has the latest drivers and versions instead of the developer trying to figure out the details of the connection string.

In an example case, the connection string is "Microsoft.Jet.OLEDB.4.0;Data Source C:\Documents and Settings\Administrator\Desktop\db1.mdb;Persist Security". "Microsoft.Jet.OLEDB.4.0" corresponds to the driver that the connecting object uses to connect to the data source. "Data Source=C:\Documents and Settings\Administrator\Desktop\db1.mdb" signifies the connection path to the access database. "Persist Security" is an initialization property for the data. The connection string is specific to the data source 30, the operating system, and the version of the software on the machine. Some additional properties that can be modified to generate other connection strings include, but are not limited to: Read, ReadWrite, Share Deny None, Share Deny Read, Share Deny Write, and Share Exclusive.

The first part of this section illustrated how to create the connection to an Access database. To connect to a real database server, the machine that is running the automatic messaging application 10 should have ODBC connectivity to the data source 30. An exemplary method for connecting is via an ODBC connection already defined in the automatic messaging application 10 simply using the same ODBC connection. However, the UDL file may be configured in any manner the user thinks fit to obtain a connection tested string that the user thinks appropriate.

Figure 7:
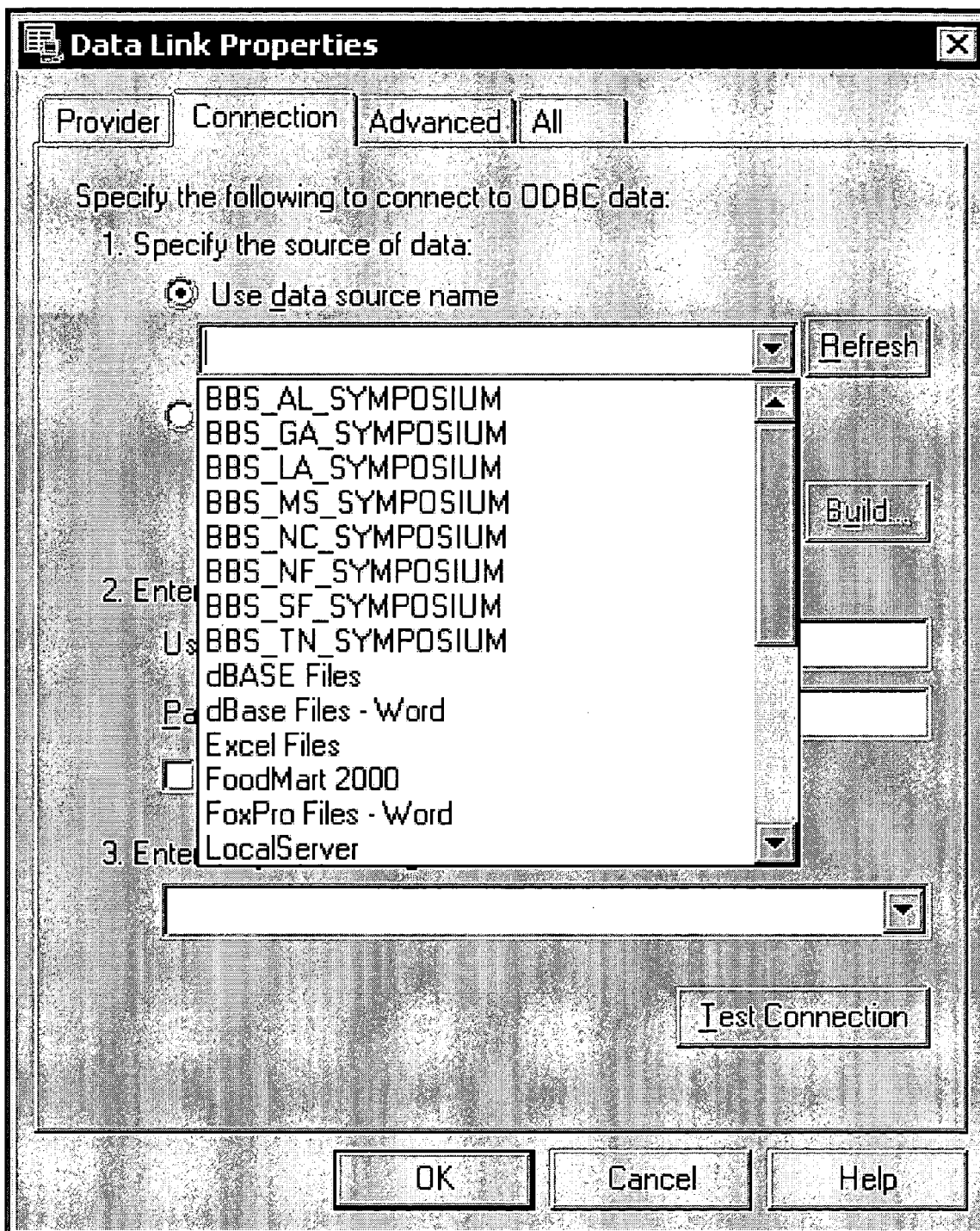
FIG. 7 illustrates an exemplary screen shot showing how the desired ODBC connection may be chosen.
Figure 8:
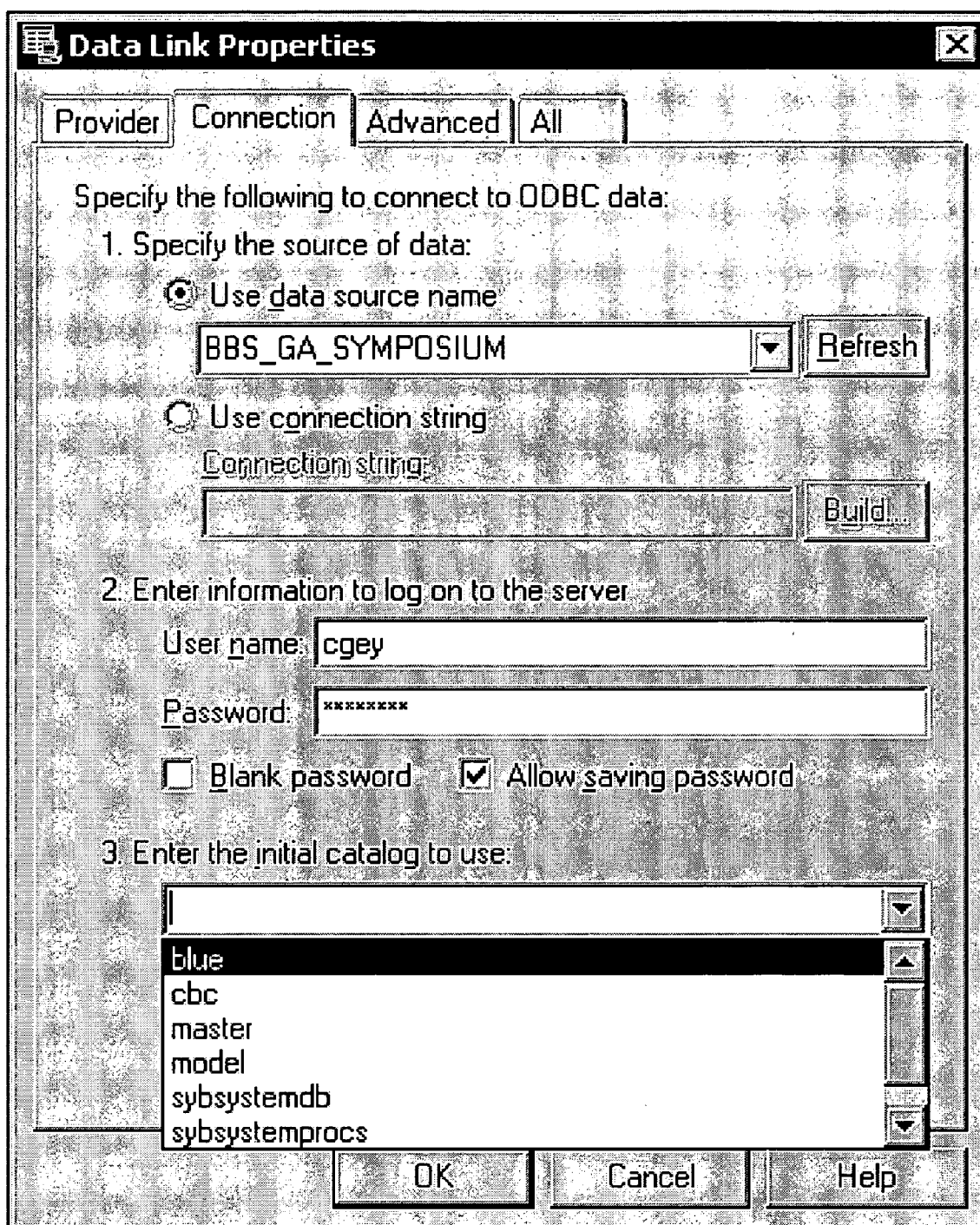
FIG. 8 illustrates an exemplary screen shot showing how to pick a catalog within a database.

FIGS. 7 and 8 illustrate how to connect to an Informix data source using an already-existing ODBC connection. First, the user double clicks on the UDL file. Then the user picks the ODBC connection preferably as shown in FIG. 7. The user then enters the user name and password to access the data source and clicks on "Allow Saving Password" so that the automatic messaging application 10 will need the password. Next, the user picks the catalog (database within the database server) as illustrated in FIG. 8. Once all the parameters have been selected, the connection to the data source may be tested. If the test is successful, the connection is ready. The user then clicks OK to exit and opens the UDL file in Note Pad in Microsoft Windows to get the connection string.

After the configuration files are assembled to handle the different emails, the scheduling of the automatic messaging application 10 may be completed. To schedule the sending of the email or the message, a preferred scheduling tool can be used. Some commonly used scheduling tools are SQL Server Enterprise Scheduler and Windows Scheduler. FIGS. 9 through 15 are tailored to using Windows Scheduler to schedule the automatic messaging application 10 using a main configuration file 15 called config.txt. It will be appreciated that similar screen shots may be used for other types of scheduling tools.

Figure 9:
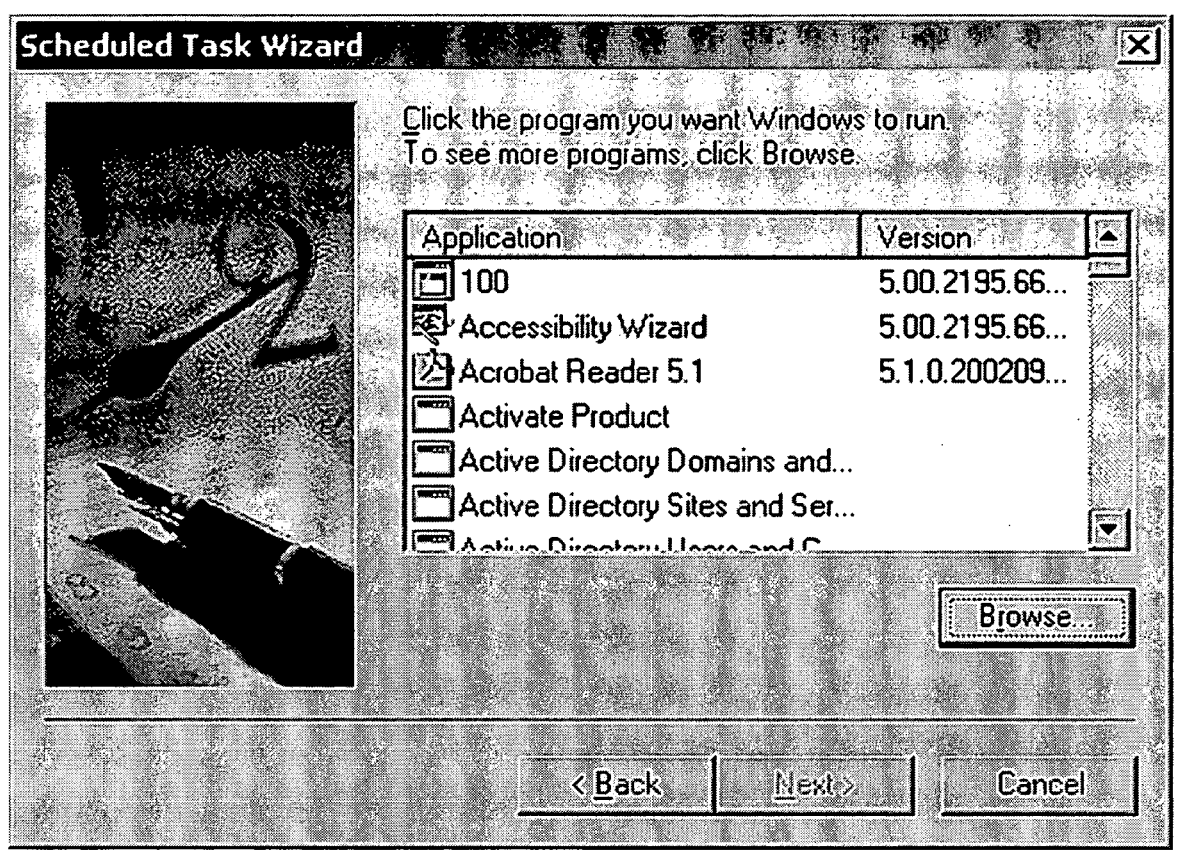
FIG. 9 illustrates an exemplary screen shot of the Windows Schedule Task Wizard.
Figure 10:
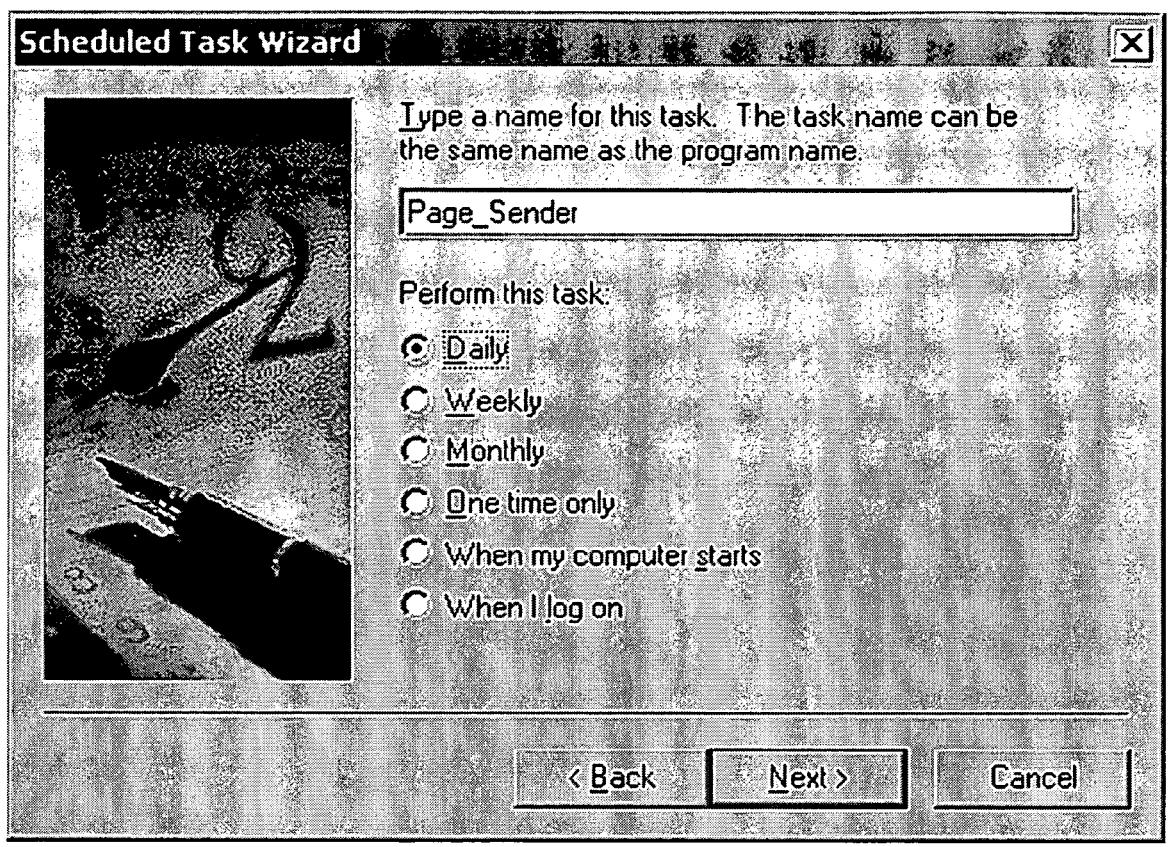
FIG. 10 illustrates an additional exemplary screen shot of the Schedule Task Wizard of FIG. 9 demonstrating how to name the task and select its iterative period.
Figure 11:
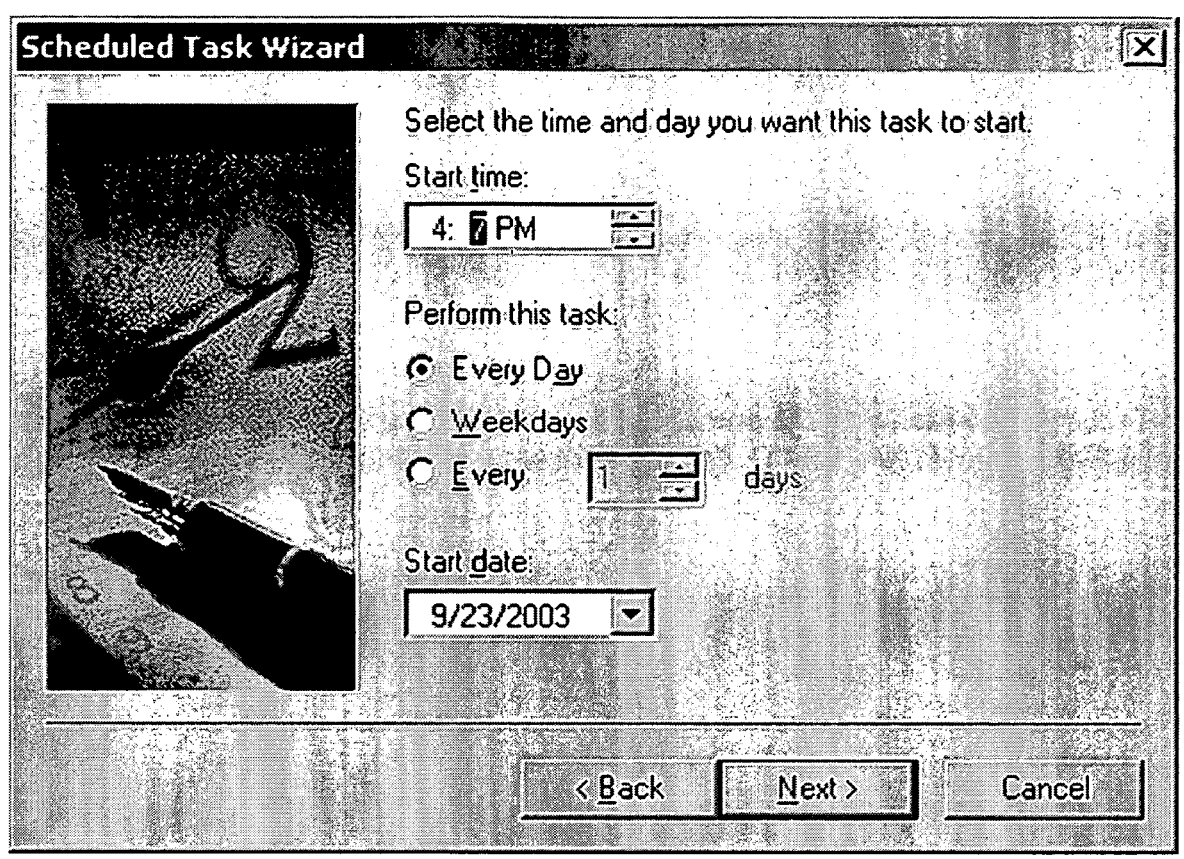
FIG. 11 illustrates an additional exemplary screen shot of the Schedule Task Wizard of FIG. 9 demonstrating how to select the time and date of the initiation of the task.

To use the Windows Scheduler as shown in FIG. 9, the user clicks on Control Panel in Windows. Next, the user double clicks on "Scheduled Tasks" and double clicks on "Add a Scheduled Task". Next, the user clicks on "Browse" to browse to the automatic messaging application 10 as illustrated in FIG. 9. Then the user selects the frequency with the task is to be executed as illustrated in FIGS. 10 and 11.

Figure 12:
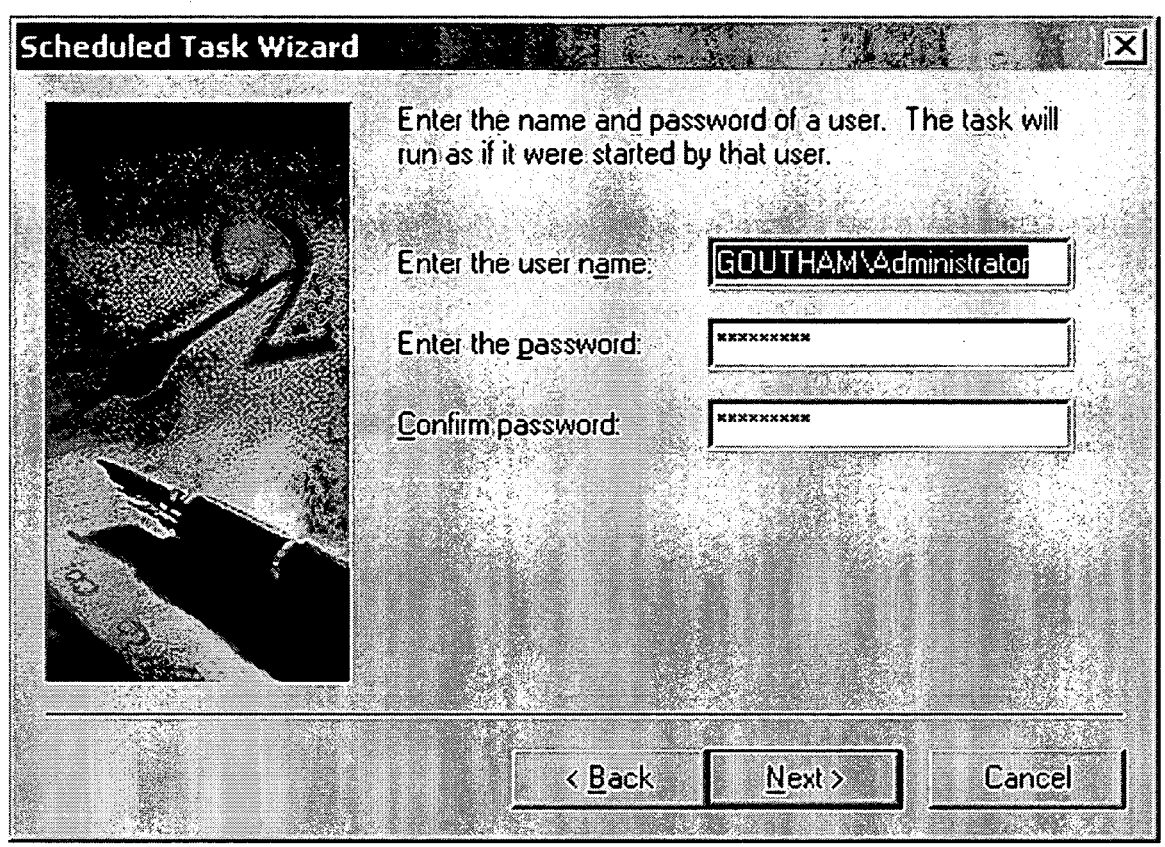
FIG. 12 illustrates an additional exemplary screen shot of the Schedule Task Wizard of FIG. 9 demonstrating how to enter the user name and password.
Figure 13:
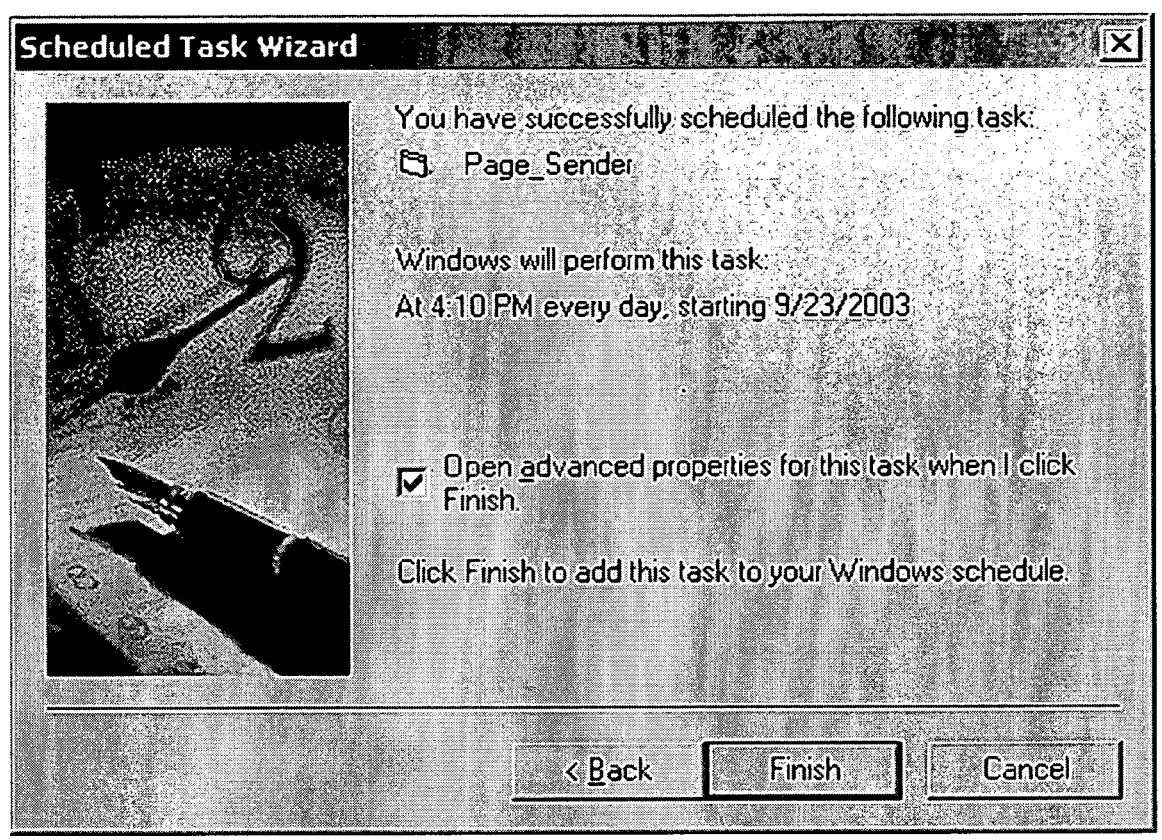
FIG. 13 illustrates an additional exemplary screen shot of the Schedule Task Wizard of FIG. 9 demonstrating the completion screen.
Figure 14:
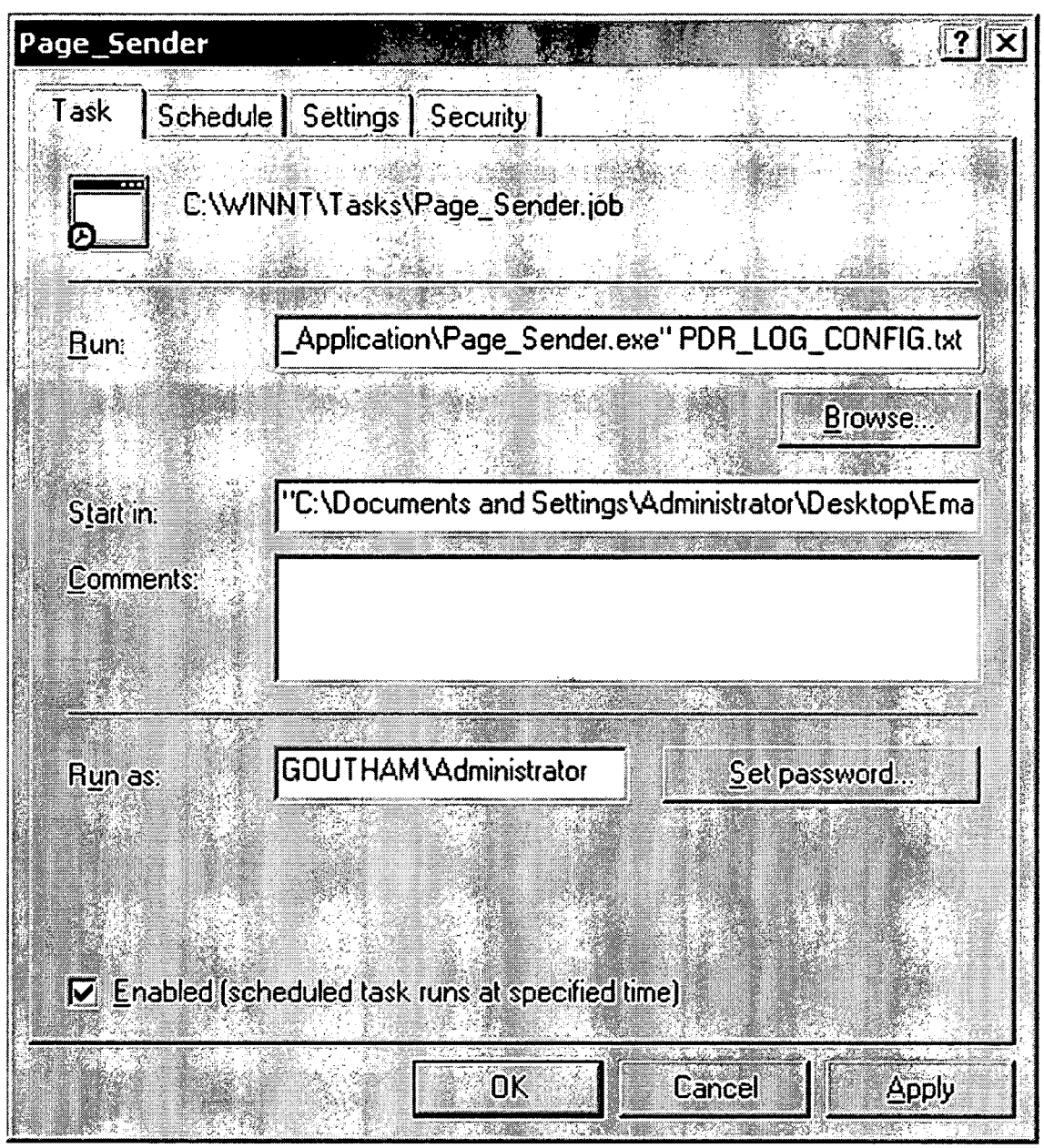
FIG. 14 illustrates an exemplary screen shot demonstrating how to run the page_sender application.
Figure 15:
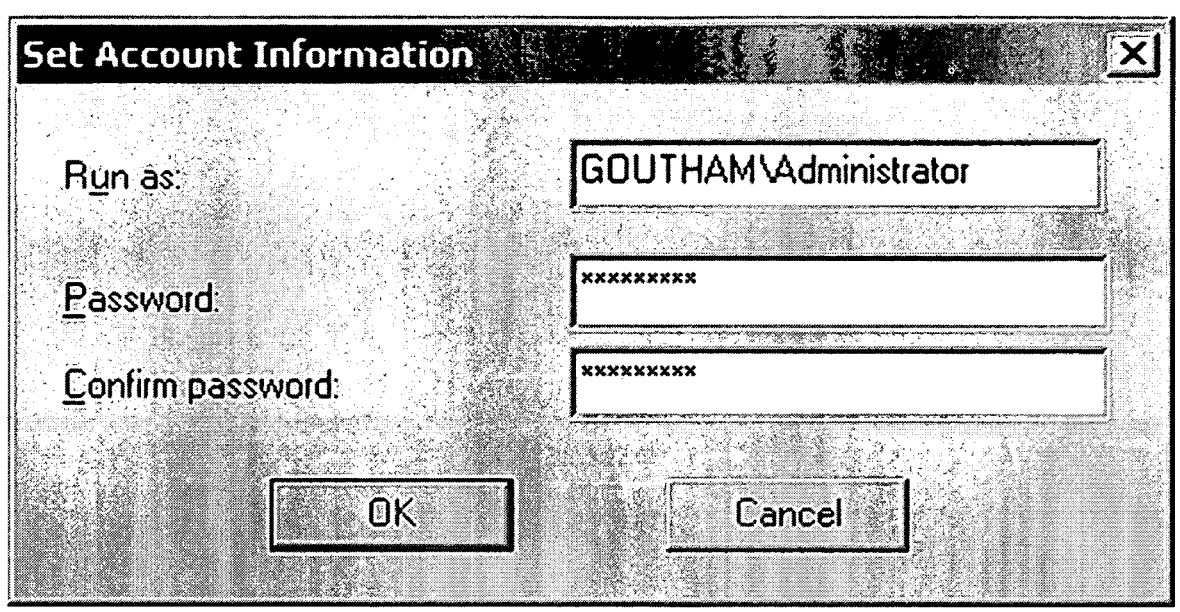
FIG. 15 illustrates an exemplary screen shot demonstrating how to configure the account information.

On the next screen, as shown in FIG. 12, the administrator password is entered since administrators may schedule anything on a Windows machine (a user with administrator privileges will also work). On the next screen, the user clicks the box titled "Open advanced properties for this task when I click Finish" as shown in FIG. 13, and then click "Finish". As shown in FIG. 14, a user may edit the run command to include the command line parameter (name of the configuration file). In the example shown in FIG. 14, it is pdr_log_config.txt. The user should check that the parameter is outside the application name and path enclosed in double quotes as shown in FIG. 14. The user then clicks "OK" and confirms the password as shown in FIG. 15. The scheduling should now be complete. A user may follow the same sequence of steps and schedule multiple tasks to schedule multiple emails, each with its own named configuration file.

Figure 16:
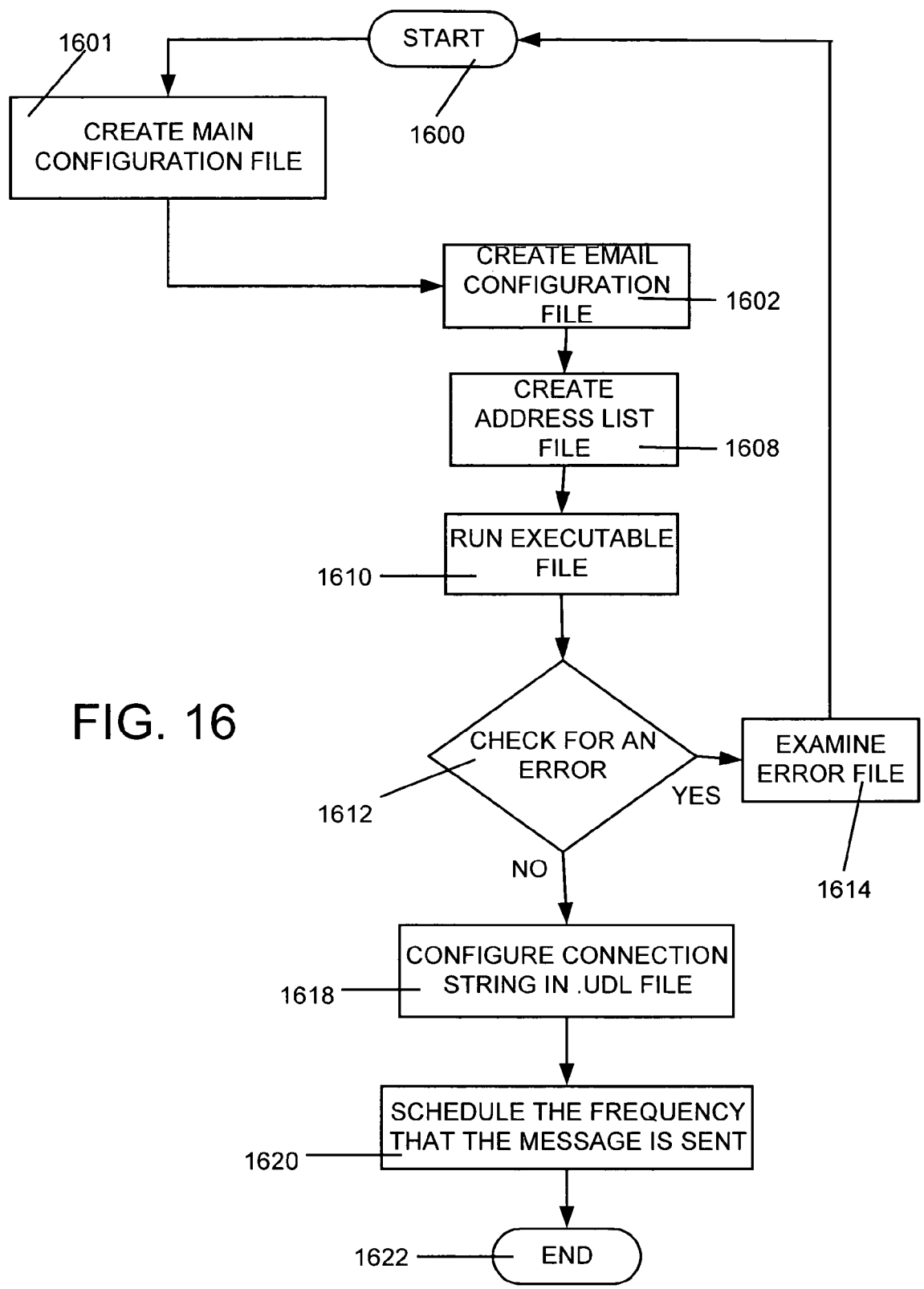
FIG. 16 is a flowchart demonstrating a process for automating the delivery of a message containing data from a database according to an exemplary embodiment.

FIG. 16 presents a flowchart demonstrating an exemplary overview of the configuration of the files for automating the delivery of data from one or more data sources 30. At 1600, the process for configuring the automation is begun. In step 1601, a main configuration file 15 is created. At step 1602, an email configuration file 20 is created which contains fields for parameters that are used by the email automatic messaging application 10 including the definitions of at least one query, among others. In step 1608, an address list file 25 is created containing the addresses of all those who are to receive the message containing the data from the data source 30. In step 1610, the application 10 is run which calls the main configuration file 15. The main configuration file 15 in turn references the email configuration file 20, which references the email address list file 25. In step 1612, the results of executing the application 10 are checked for errors. If an error has occurred as indicated in step 1614, an error file is examined. After the error file is examined, the user restarts the process. If an error has not occurred, as shown in step 1618, the user configures the connection string in the UDL file. In step 1620, the frequency that the message is sent is scheduled, and the process ends at step 1622. Steps in FIG. 16 can be performed in a different order without changing the outcome of the process.

Figure 17:
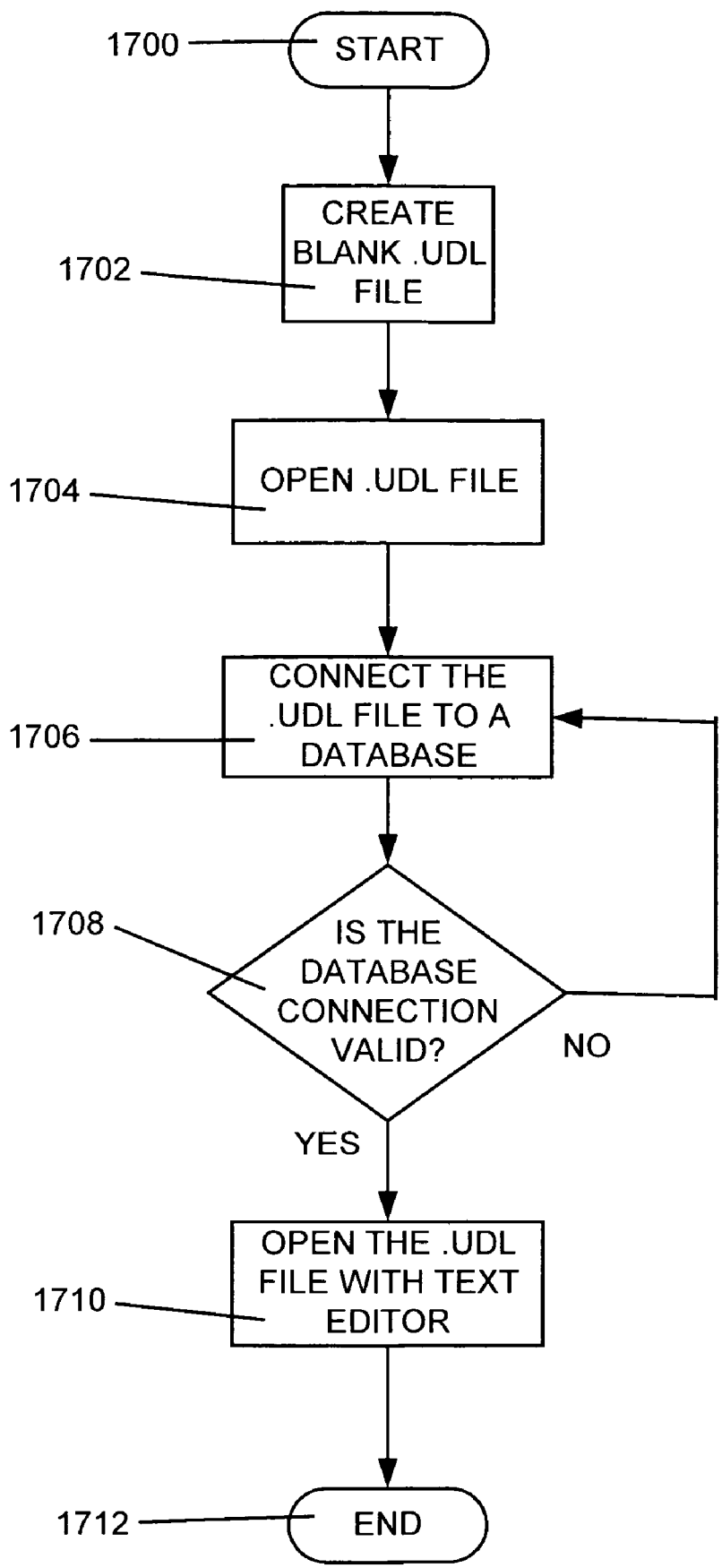
FIG. 17 is a flowchart demonstrating the process of connecting a UDL file to a database according to an exemplary embodiment.

FIG. 17 is a flow chart demonstrating an exemplary process of connecting a UDL file to a database. In step 1700, the process is begun. In step 1702, a blank UDL file is created. In step 1704, the UDL file is opened in a text editor. After the UDL file is created it is connected to a database in step 1706. In step 1708, the database connection is tested. If the connection is not valid, then step 1706 is revisited and the UDL file is connected to a valid database. If it is valid, then the UDL file is opened with a text editor in step 1710. Step 1712 ends the process of connecting a UDL file to a database.

Figure 18:
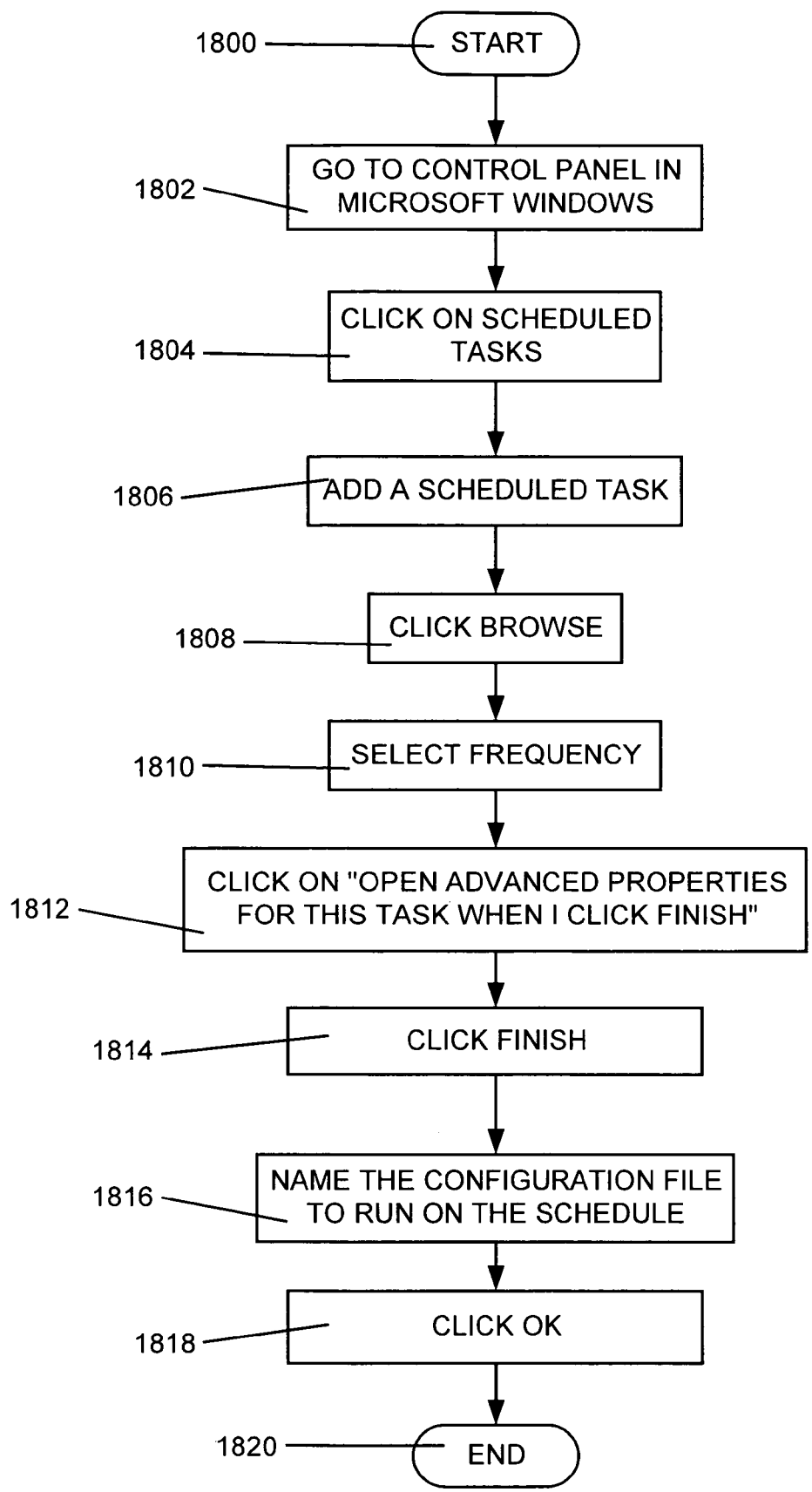
FIG. 18 is a flowchart demonstrating the process of configuring the scheduler according to an exemplary embodiment.

FIG. 18 is a flow chart demonstrating an exemplary process of configuring the scheduler. The process is begun in step 1800. In step 1802, the user opens the control panel in Microsoft Windows. In step 1804, the user clicks on "Schedule Task" in the control panel. In 1806, the user adds a scheduled task and clicks "Browse" in step 1808. In step 1810, the user selects the frequency at which the message should be sent out, i.e., the frequency with which step 1610 is executed in FIG. 16. In step 1812, the user clicks on the radio button for "Open advanced properties for this task when I click Finish." In step 1814, the user clicks "Finish." In step 1816, the user names the configuration file that will be run per the schedule defined in step 1810. In step 1818, the user clicks "OK." The process is ended in step 1820.

According to an exemplary embodiment, a sample main configuration file 15 contains the following five lines:
Sender=moease.hollis@bellsouth.com
SMTP=mail.bst.bls.com;mailhub.bbs.bls.com;iocspam.bls.com
Port=25
Query_File=query.ini
default_mandatory_Email_Address=eryksmith@imcingular.com According to an exemplary embodiment, a sample email configuration file 20 with two email configurations in one file is shown with the following:

This file has the query and other parameters for the query
Keywords include today, yesterday, this_month, firstdayofmonth
Here is the order of things that need to be there between the start and end
Note please avoid extra NEW LINES these make the application bomb
ConnString will specify the connection string that will allow the app to connect to your database
following that you can have as many lines of a single SQL statement
the fields of the SQL will be emailed to the recipient list
then specify the sender name (not address)
then specify the subject of the page
then specify as many header lines as you want to precede the body of the page
then specify as many footer lines as you want to succeed the page
then specify the name of the file that will house the list of recipients
<!--Begin Query 1-->
CONN_STRING=Provider=SQLOLEDB.1;Database=BIGFOOT;User ID=webuser;Password=webuser;Data Source=90.164.189.64
SQL = select convert(decimal(10,2),BRC_ASA) [BRC ASA DAILY], convert(decimal(10,2),brc_abnd) [BRC ABND DAILY]
SQL = ,convert(decimal(10,2),BRC_ASA_MTD) [BRC ASA MTD], convert(decimal(10,2),BRC_ABND_MTD) [BRC ABND MTD]
SQL =
SQL = from
SQL = (
SQL = select BRC_ASA = case ASA_DENOMINATOR when 0 then 0 else ASA_NUMERATOR/ASA_DENOMINATOR end
SQL = From ( select sum(measure_value) ASA_DENOMINATOR from measures_daily
SQL = where measure_name = 'ASA_DENOMINATOR' and report_date = left(getdate( )–1,11)) a,
SQL = ( select sum(measure_value) ASA_NUMERATOR from measures_daily
SQL = where measure_name = 'ASA_NUMERATOR' and report_date = left(getdate( )–1,11) )b
SQL = )a,
SQL = ( select BRC_ABND = case BBS_Calls_Offered when 0 then 0 else 100.0*BBS_Calls_Abandoned/BBS_Calls_Offered end
SQL = From (select sum(measure_value) BBS_Calls_Offered from measures_daily
SQL = where measure_name = 'BBS_Calls_Offered' and report_date = left(getdate( )–1,11)) a,
SQL = ( select sum(measure_value) BBS_Calls_Abandoned from measures_daily
SQL = where measure_name = 'BBS_Calls_Abandoned' and report_date = left(getdate( )–1,11) )b
SQL = )b,
SQL =
SQL =
SQL = (
SQL = select BRC_ASA_MTD = case ASA_DENOMINATOR when 0 then 0 else ASA_NUMERATOR/ASA_DENOMINATOR end
SQL = From (select sum(measure_value) ASA_DENOMINATOR from measures_monthly
SQL = where measure_name = 'ASA_DENOMINATOR' and datepart(month,report_date) = datepart(month,getdate( )–1)) a,
SQL = ( select sum(measure_value) ASA_NUMERATOR from measures_monthly
SQL= where measure_name = 'ASA_NUMERATOR' and datepart(month,report_date) = datepart(month,getdate( )–1) )b
SQL = )c,
SQL =
SQL = (
SQL = select BRC_ABND_MTD = case BBS_Calls_Offered when 0 then 0 else 100.0*BBS_Calls_Abandoned/BBS_Calls_Offered end
SQL = From ( select sum(measure_value) BBS_Calls_Offered from measures_monthly
SQL = where measure_name = 'BBS_Calls_Offered' and datepart(month,report_date) = datepart(month,getdate( )–1)) a,
SQL = ( select sum(measure_value) BBS_Calls_Abandoned from measures_monthly
SQL = where measure_name = 'BBS_Calls_Abandoned' and datepart(month,report_date) = datepart(month,getdate( )–1) )b
SQL = )D
Sender=Bigfoot Server
Subject=Business Repair Center Page
header=Business Data for yesterday
header=
Footer=Confidential and proprietary
Footer=POWERED BY BIGFOOT: BIGFOOT.BST.BLS.COM
Footer=FOR INFO: MICHELLERANDOLPH@IMCINGULAR.COM
Recepients=BRC_PAGER_ADDRESSES.txt -continued

```
<!--End Query 1-->
<!--Begin Query 2-->
CONN_STRING=Provider=SQLOLEDB.1;Database=BIGFOOT;User
ID=webuser;Password=webuser;Data Source=90.164.189.64
sql = select ABND[RRC ABND DAILY], ASA[RRC ASA DAILY], abnd_MTD
[RRC ABND MTD] , ASA_MTD [RRC ASA MTD]
sql = from
sql = (
sql = select abnd = convert(decimal(10,2),case
sum(Calls_answered+calls_Abandoned)
sql =    when 0 then 0 else sum(calls_Abandoned) * 100.0 /
sum(Calls_answered+calls_Abandoned) end)
sql =    , ASA= convert(decimal(10,2),case sum(Calls_answered) when 0 then
0 else sum(Total_Answer_Delay) * 1.0 / sum(Calls_answered) end )
sql =    from rfmc.dbo.morning_report where EXTRACT_DATE =
left(getdate( )-1,11)
sql = ) a,
sql = (
sql =    select abnd_MTD = convert(decimal(10,2),case
sum(Calls_answered+calls_Abandoned)
sql =    when 0 then 0 else sum(calls_Abandoned) * 100.0 /
sum(Calls_answered+calls_Abandoned) end )
sql =    , ASA_MTD= convert(decimal(10,2),case sum(Calls_answered) when
0 then 0 else sum(Total_Answer_Delay) * 1.0 / sum(Calls_answered) end )
sql = from rfmc.dbo.morning_report where
datepart(month,EXTRACT_DATE) = datepart(month,getdate( )-1)
sql = )b
Sender=Bigfoot Server
Subject=Residence Repair Center Page
header=Residence Data for yesterday
header=
Footer=Confidential and proprietary
Footer=POWERED BY BIGFOOT: BIGFOOT.BST.BLS.COM
Footer=FOR INFO: MICHELLERANDOLPH@IMCINGULAR.COM
Recepients=RRC_PAGER_ADDRESSES.txt
   <!--End Query 2-->
```

Figure 19:
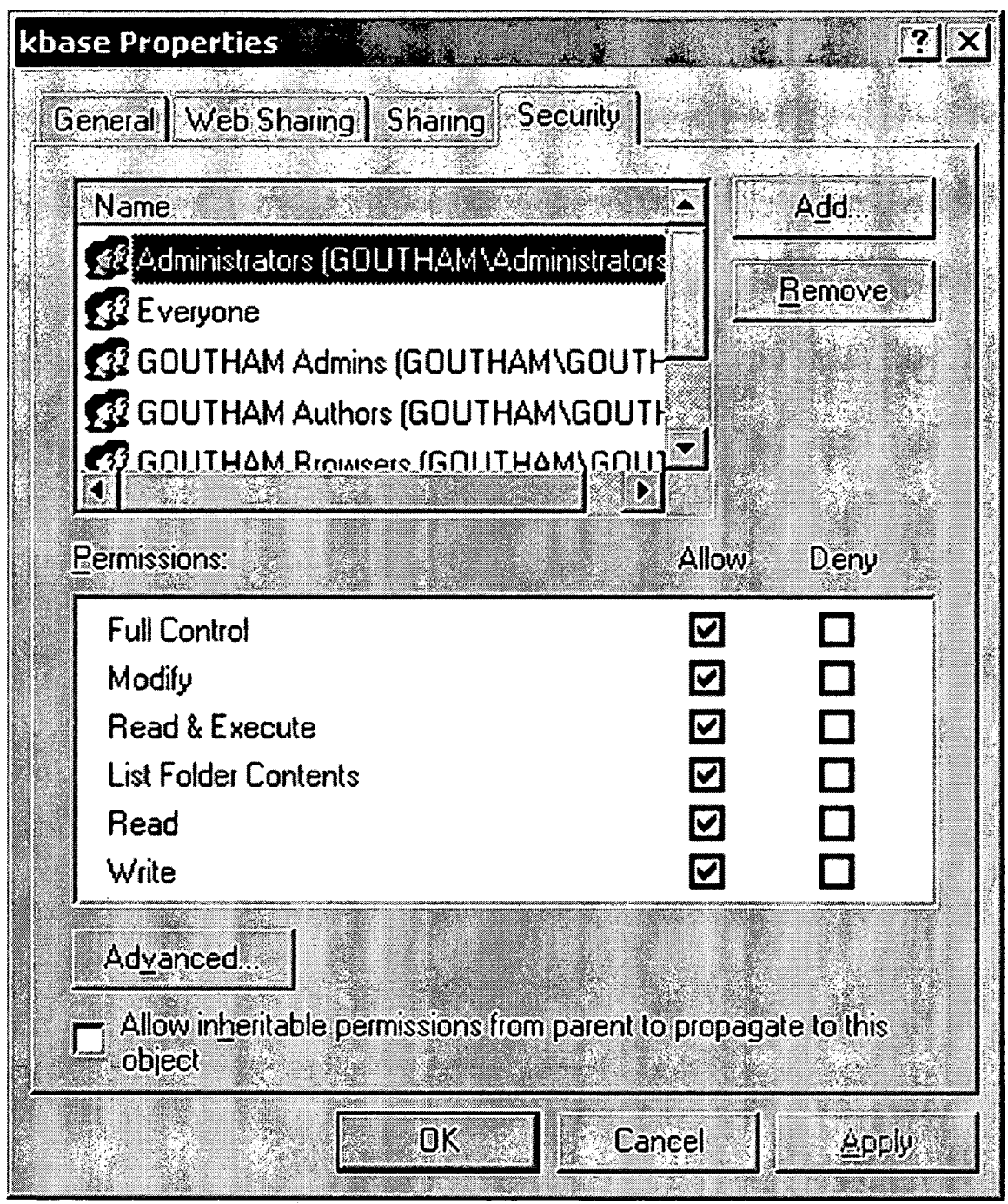
FIG. 19 illustrates an exemplary screen shot demonstrating how to enable IIS to write to the database and to folders within the database.
Figure 20:
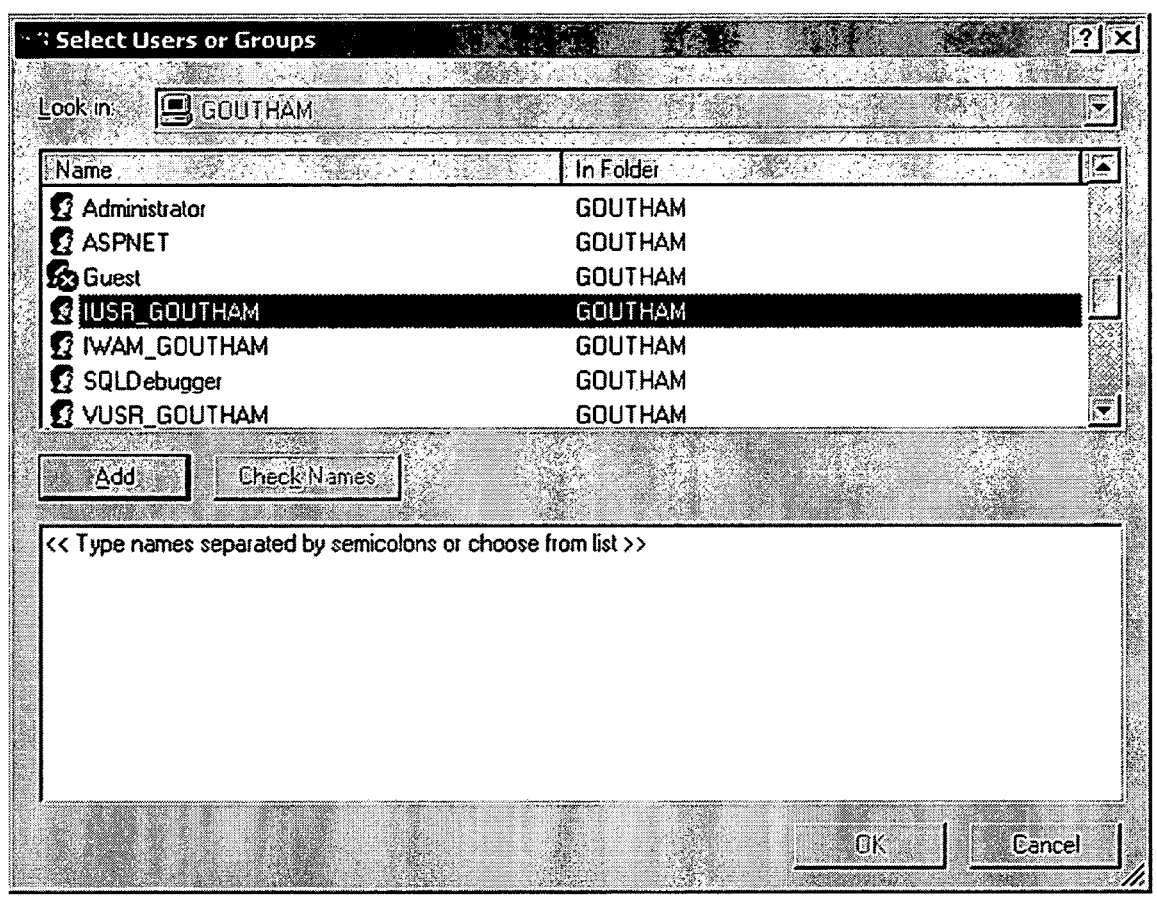
FIG. 20 illustrates an exemplary screen shot demonstrating how to find a user to enable as in FIG. 19.
Figure 21:
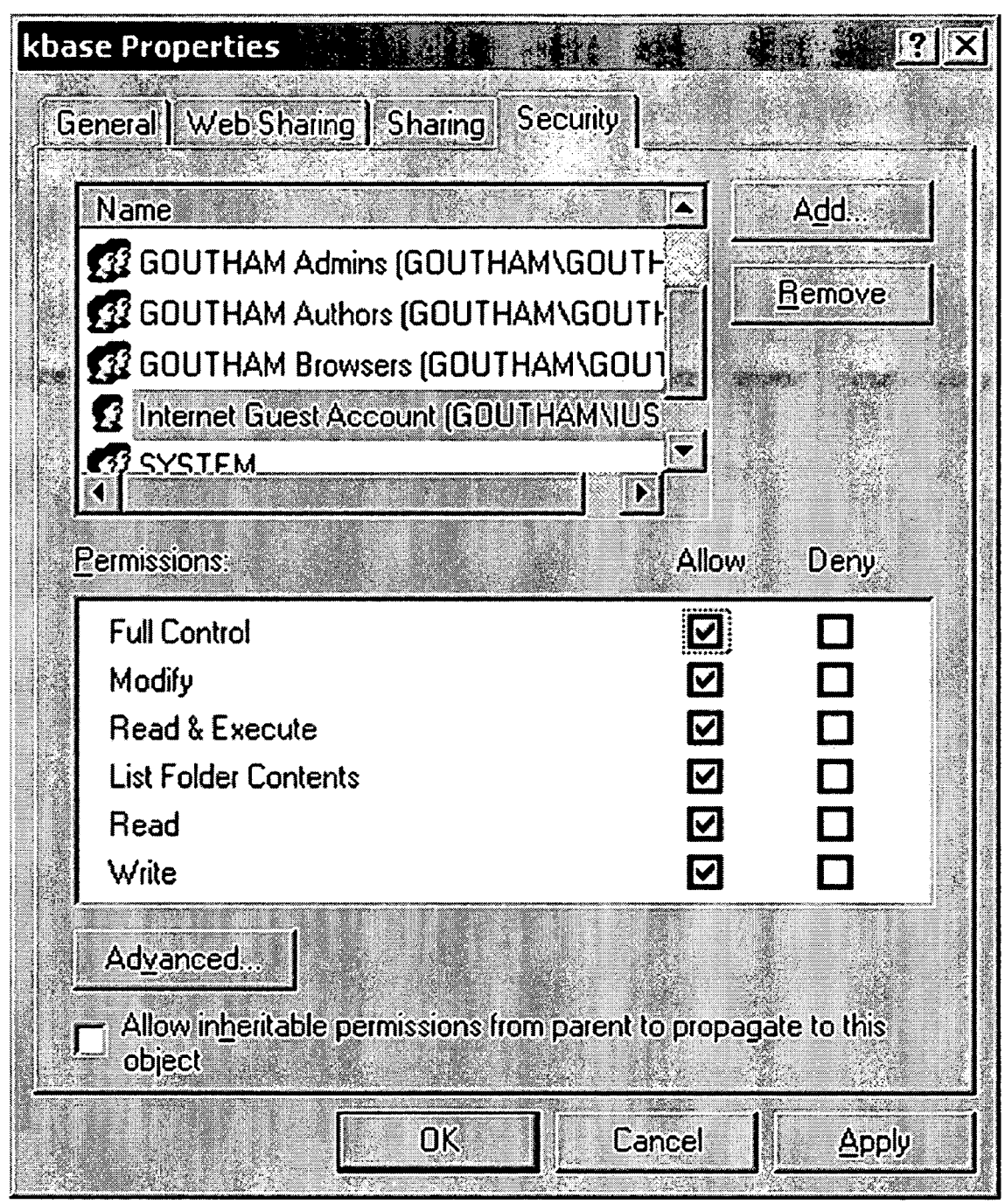
FIG. 21 illustrates an exemplary screen shot demonstrating how to give control to the user of FIG. 20.

According to an exemplary embodiment, a sample address list file 25 is:

gbelliappa@imcingular.com
michellerandolph@imcingular.com
catchison@imcingular.com The user may also enable write access to the Internet user group to enable IIS (Internet Information Service, a part of Microsoft Windows) to write to the database 30. To do this, the user first right clicks on a database folder, then selects Properties, and selects the Securities tab. Then the user clicks on Add, as shown in FIG. 19. Next, the user finds the IUSER_COMPUTER NAME (where IUSER_COMPUTER NAME is the name of the user's computer) as shown in FIG. 20, and then clicks Add and OK. He then gives full control to that user as shown in FIG. 21.

Any process descriptions or blocks in the figures should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The automatic messaging tool, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

Therefore, having thus described the disclosure, at least the following is claimed:

1. A system comprising:
   at least one computer processor;
   querying logic configured with at least configuration information for selecting data from a plurality of data sources,
   wherein a first configuration information file includes a plurality of sets of instructions for selecting the data from the plurality of data sources, each set of instructions comprising:
      connection string to connect to a data source, the connection string being abstracted by an operating system, wherein the operating system is a WINDOWS operating system;
      structured query language statement to select data from the data source to send in a message;
      a subject of the message;
      a message header; and
      an address corresponding to the sender of the message;
   messaging logic configured with at least a second configuration information file for automatically sending the selected data within the message to an address entry of an address list, wherein the second configuration information file specifying the address list includes:
      a list of addresses for sending the message;
   a scheduler for scheduling a periodicity that the selected data is sent by the messaging logic, wherein the scheduler is a WINDOWS scheduler; and
   testing logic configured to test a connection to the data source according to the connection string,
   wherein the plurality of sets of instructions for selecting the data from the plurality of data sources contains instructions for connecting to at least two different data sources,
   wherein the first configuration information file is saved as a file in memory, and the messaging logic is an email system.

2. The system of claim 1, wherein the first configuration information file further includes a default email address.

3. The system of claim 1, wherein an error file is generated when a configuration information file results in an error.

4. The system of claim 1, further comprising:
   the memory for saving the first and second configuration information files; and
   the at least one computer processor configured with at least third configuration information for processing the data source with data.

5. A method of automatically transmitting data comprising:
   maintaining an address list of address entries;
   configuring a first configuration file with information to select data from a plurality of databases and to automatically send data from the plurality of databases to the address entries in the address list, wherein the address list is specified in a second configuration file; and
   executing an application using the information from the first configuration file to send a plurality of messages including data from the plurality of databases to the address entries in the address list using a messaging system, wherein the messaging system is an email system;
   wherein the information in the first configuration file includes a plurality of sets of instructions for selecting the data from the plurality of data sources, each set of instructions comprising:
      a connection string to connect to a data source, the connection string being abstracted by an operating system, wherein the operating system is a WINDOWS operating system, wherein the plurality of sets of instructions for selecting the data from the plurality of data sources contains instructions for connecting to at least two different data sources;
      a structured query language statement to select data from the data source to send in a message;
      a subject of the message;
      a message header; and
      an address corresponding to a sender of the message;
   wherein the second configuration file specifying the address list includes:
      a list of addresses for sending the message;
   scheduling a periodicity that the data selected is sent using a WINDOWS scheduler;
   testing a connection to the data source according to the connection string,
   wherein the plurality of sets of instructions for selecting the data from the plurality of data sources contain instructions for connecting to at least two different data sources.

6. The method of claim 5, wherein the first configuration file further includes a default email address.

7. The method of claim 5, wherein configuring the first configuration file further includes configuring the messaging system.

8. The method of claim 7, further including generating an error file when an error results from the execution of the application.

9. Non-transitory computer readable storage medium including executable computer code for performing a method for automatically sending a message with selected data, the method comprising:
   saving an address in a memory device, the address corresponding to an intended recipient of a message;
   selecting a set of instructions, from a plurality of sets of instructions contained in a first configuration file, for selecting data from a plurality of databases of a plurality of data servers, each set of instructions comprising:
      a connection string to connect to a database, the connection string being abstracted by an operating system, wherein the operating system is a WINDOWS operating system and the plurality of sets of instructions for selecting the data from the plurality of databases contains instructions for connecting to at least two different data servers of the plurality of data servers;
      a structured query language statement to select data from the database to send in a message;
      a subject of the message; and
      a message header;
   for each set of instructions, connecting to the database and querying the database for selected data from the database;
   for each set of instructions, creating the message to include the results of the query;
   for each set of instructions, automatically sending the message to the address of the intended recipient using a messaging system, wherein the address is specified in a second configuration file and the messaging system is an email system, wherein the sending of the message is according to a schedule defined using a WINDOWS scheduler;
scheduling a periodicity that the message is sent using the WINDOWS scheduler;
saving an address corresponding to a sender of the message in the first configuration file;
saving the address corresponding to a the intended recipient in a list of addresses for sending the message in the second configuration file, wherein the first configuration file contains a name of the second configuration file;
saving a name of a file where queries are stored in the first configuration file;
checking for an error resulting from the execution of the application; and
testing a connection to the database according to the connection string, wherein the plurality of sets of instructions for selecting the data from the plurality of data servers contains instructions for connecting to at least two different data servers.

\* \* \* \* \*